(12) United States Patent
Della Penna

(10) Patent No.: US 12,591,811 B2
(45) Date of Patent: Mar. 31, 2026

(54) MACHINE LEARNING REQUEST FULFILLMENT PLATFORM

(71) Applicant: GroupLang Company, Middletown, DE (US)

(72) Inventor: Nicolás Della Penna, Montevideo (UY)

(73) Assignee: GroupLang Company, Middletown, DE (US)

( * ) Notice: Subject to any disclaimer, the term of this patent is extended or adjusted under 35 U.S.C. 154(b) by 0 days.

(21) Appl. No.: 18/753,901

(22) Filed: Jun. 25, 2024

(65) Prior Publication Data

US 2025/0335819 A1 Oct. 30, 2025

Related U.S. Application Data

(60) Provisional application No. 63/640,532, filed on Apr. 30, 2024.

(51) Int. Cl.
| | |
|---|---|
| *G06N 20/00* | (2019.01) |
| *G06Q 10/0631* | (2023.01) |
| *G06Q 20/06* | (2012.01) |
| *G06Q 30/08* | (2012.01) |

(52) U.S. Cl.
CPC ......... _G06N 20/00_ (2019.01); _G06Q 10/0631_ (2013.01); _G06Q 20/065_ (2013.01); _G06Q 30/08_ (2013.01)

(58) Field of Classification Search
None
See application file for complete search history.

(56) References Cited

U.S. PATENT DOCUMENTS

| | | | | |
|---|---|---|---|---|
| 11,847,670 | B1* | 12/2023 | Zhou | G06Q 30/0255 |
| 2014/0095324 | A1* | 4/2014 | Cabral | G06Q 30/08 |
| | | | | 705/14.71 |
| 2015/0051997 | A1* | 2/2015 | Taoussanopoulos ... | G06Q 30/08 |
| | | | | 705/26.3 |
| 2020/0128053 | A1* | 4/2020 | Rosanuru | G06Q 20/407 |
| 2020/0372569 | A1* | 11/2020 | Lahiri | G06Q 30/0609 |

(Continued)

OTHER PUBLICATIONS

Feizi, Soheil, et al. "Online advertisements with llms: Opportunities and challenges." arXiv preprint arXiv:2311.07601 (2023). (Year: 2023).*

(Continued)

*Primary Examiner* — Sara Grace Brown
(74) *Attorney, Agent, or Firm* — Mintz Levin Cohn Ferris Glovsky and Popeo, P.C.

(57) ABSTRACT

A process fulfills a request for machine learning output data. The process begins by receiving, from a requester computer program, a request for data. The process next generates a reward function. The reward function determines a reward based at least in part on a plurality of response signals. A response signal of the plurality of response signals is based at least in part on the request for data. The process next selects a provider computer program using at least the reward function. The process next provides, to the requester computer program, a fulfilled request from the provider computer program. The fulfilled request is generated at least in part by processing the request for data with a machine learning model. The process next receives, from the requester computer program, a reward allocation for the provider computer program.

18 Claims, 5 Drawing Sheets

200

Receive, from a requester computer program, a request for data
210

Generate a reward function
220

Select a provider computer program using at least the reward function

Receive a reward allocation for the provider computer program

(56) References Cited

U.S. PATENT DOCUMENTS

| | | | | |
|---|---|---|---|---|
| 2023/0252224 | A1* | 8/2023 | Tran | G06F 40/56 |
| | | | | 715/256 |
| 2024/0265420 | A1* | 8/2024 | Glazier | H04L 67/535 |
| 2024/0267344 | A1* | 8/2024 | Mulligan | H04L 51/214 |
| 2024/0310900 | A1* | 9/2024 | Kocienda | G06V 20/20 |
| 2024/0378449 | A1* | 11/2024 | Ausubel | G06N 3/096 |
| 2024/0394735 | A1* | 11/2024 | Rajamani | G06Q 30/0202 |
| 2024/0394789 | A1* | 11/2024 | Doane | G06Q 30/08 |

OTHER PUBLICATIONS

Della Penna, Nicolás. "Advice Auctions." MIT. (2021). (Year: 2021).*

* cited by examiner

100

200

Receive, from a requester computer program, a request for data
210

Generate a reward function
220

Select a provider computer program using at least the reward function

Receive a reward allocation for the provider computer program

300

MACHINE LEARNING REQUEST FULFILLMENT PLATFORM

CROSS-REFERENCE TO RELATED APPLICATIONS

This application claims the benefit of, and priority to U.S. Provisional Application 63/640,532, filed Apr. 30, 2024, and incorporates its disclosure herein by reference in its entirety.

BACKGROUND

Artificial intelligence (AI)-based chat bots are increasingly used to provide information and services to users. These chat bots may receive input prompts comprising text and/or other data, and respond with a generative output fulfilling the request. In some cases, chat bot outputs may be inadequate to serve the needs of the user making the request. To improve responses from AI chatbots, providers of machine learning-generated outputs often have to choose between prioritizing prompt engineering and improving or fine-tuning their models.

SUMMARY

In some example embodiments, there may be provided a method including receiving, from a requester computer program, a request for data; generating a reward function, wherein the reward function determines a reward based at least in part on a plurality of response signals, wherein a response signal of the plurality of response signals is based at least in part on the request for data; selecting a provider computer program using at least the reward function; providing, to the requester computer program, a fulfilled request from the provider computer program, wherein the fulfilled request is generated at least in part by processing the request for data with a machine learning model; and receiving, from the requester computer program, a reward allocation for the provider computer program.

In some variations, one or more of the features disclosed herein including the following features can optionally be included in any feasible combination. The request for data comprises a request for an output generated by a machine learning model. The machine learning model is a generative model. The generative model is a natural language processing or natural language understanding model. The natural language processing model or natural language understanding model is a large language model. The request for text comprises input data for the generative model. The output is provided by an automated chat program. The requestor computer program is an automated chat program. The requestor program provides automated chat messages to a user via a user interface. Selecting a provider computer program using at least the reward function comprises: providing a value of the reward to a plurality of provider computer programs; receiving a plurality of response signals from a plurality of provider computer programs; selecting the provider computer program based at least in part on a response signal of the provider computer program. The response signal is a highest-value response signal. The reward allocation comprises a portion of the reward. The portion of the reward is equal to a lowest value response signal of the provider computer program subtracted from the value of the reward, wherein the lowest value response signal of the provider computer program corresponds to a smallest-magnitude value that would have resulted in the provider program being selected. Processing the request for data comprises generating a generative model prompt. The reward comprises an electronic credit. Providing the fulfilled request comprises verifying an electronic credit balance of the requester computer program. Providing the fulfilled request comprises verifying one or more credentials of the requester computer program. Selecting a provider computer program comprises verifying whether the provider computer program is whitelisted by the requester computer program.

In some example embodiments, there may be provided a system including a requester computer program; a plurality of provider computer program; and a reward computer program. The requester computer program is configured to: generate a request for text; and provide a reward allocation to the reward computer program. A provider computer program of the plurality of provider computer programs is configured to: generate a response signal based at least in part on the request for text; generate a fulfilled request at least in part by processing the request for text with a machine learning model. The administrator computer program is configured to generate a reward function, which determines a reward based at least in part on the plurality of response signals; select a provider computer program using at least the reward function; and receive a reward allocation for the provider computer program from the requester computer program.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Systems and methods for providing a two-sided machine learning model output exchange for software agents. A system described herein may include a requester agent, at least one provider agent, and an administrator agent. The system may enable a requester agent to make a request for machine learning model output. The one or more providers may submit bids to fulfill the request, in exchange for an award from the requester. The administrator agent may determine one or more highest bids from the one or more providers and provide the information for the one or more highest-bidding providers to the requester. The requester may provide necessary information to the one or more providers to complete the request. Once the request is complete, the administrative agent may allocate a portion of the reward among the providers.

The described system may benefit the functioning of both the requester agent and the provider agent. For example, the requester agent may be able to provide improved or enhanced information or services by incentivizing providers to compete to produce the content. And the provider agent may benefit from having a source of readily available prompt data, freeing up resources previously used to obtain prompts to instead improve performance of the provider agent's machine learning models on well-defined machine learning tasks.

Figure 1:
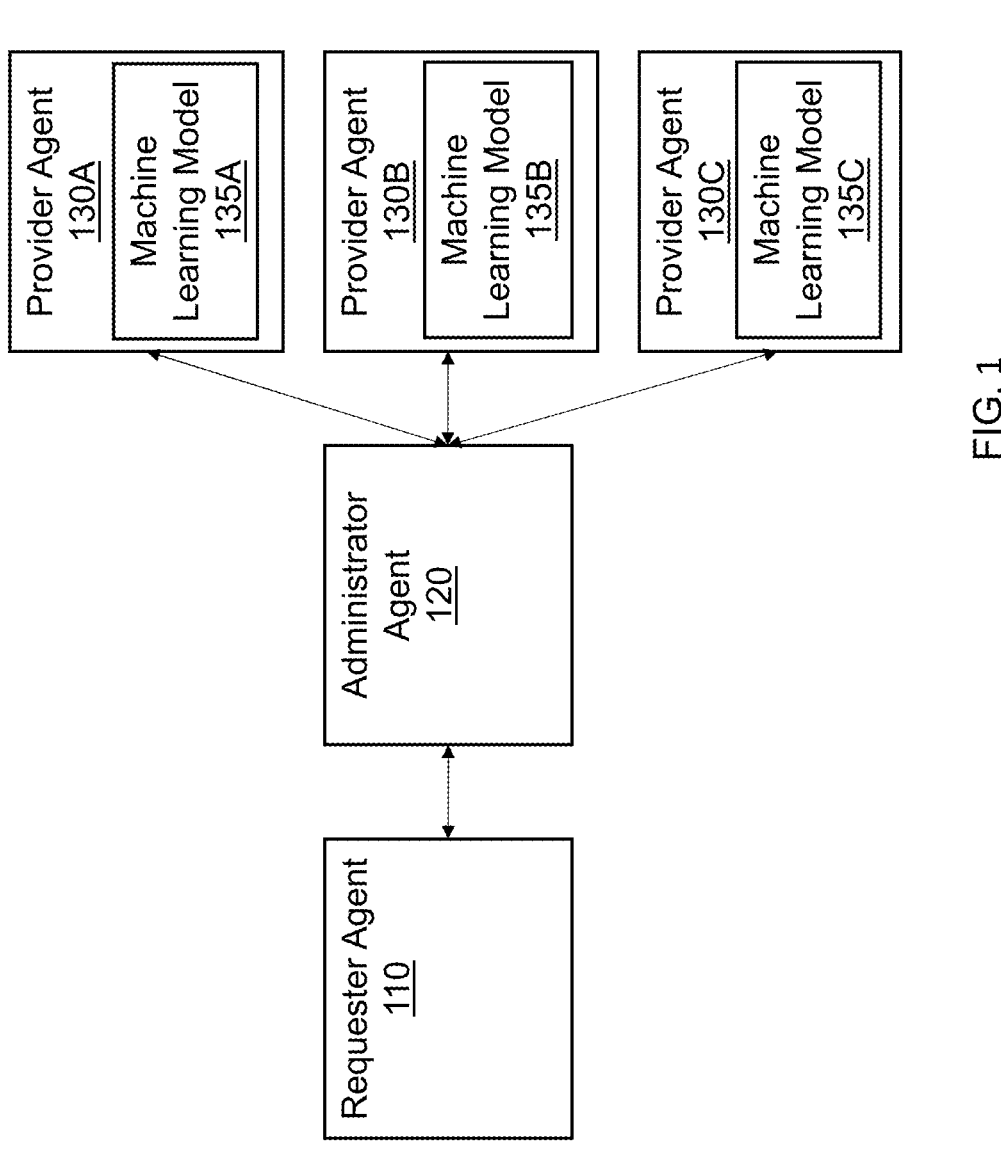
FIG. 1 illustrates a system for automatically fulfilling a request for processed data, in accordance with some embodiments.

FIG. 1 illustrates a system 100 for automatically fulfilling a request for processed data, in accordance with some embodiments. The system may include a requester agent 110, provider agents 130A-C, and administrator agent 120. In some embodiments, the system may comprise additional requester agents and/or additional or fewer provider agents.

The requester agent 110 may comprise a computer program configured to provide information and/or services to a user or to another computer program or system. The information or service provided by the requester agent 110 may be generated by a machine learning model (e.g., a generative model). Interacting within system 100 may enable the requester agent 110 to optimize the content it serves. For example, the requester agent 110 may request content that maximizes visits to a web page, conversions, or optimizes with respect to another Internet-based metric. The requested content may provide a resolution of a software issue by a software engineer agent (the provider is rewarded if the PR produced by the agent is merged). The content may serve to train or fine-tune a conversational model that rewards high-quality answers produced by the conversational model. The requester agent 110 may associate a reward with the content requested and may attempt to maximize the reward.

The requester agent 110 may, for example, comprise a chat bot (e.g., conversational entity, conversational agent, or smart assistant) configured to provide information to a user via voice or text. The requester agent 110 may mimic a human conversation, either by voice or text, with a user to provide the user with information and/or services. The requester agent 110 may receive information input by a user (e.g., a query or request). The requester agent 110 may be configured to accurately understand a user query and to respond accordingly, for example, by returning a relevant response, or completing a task or action. The requester agent 110 may be implemented using a combination of one or more of rules, keywords analysis, and artificial intelligence. The requester agent 110 may be accessed by a user through a messaging service or chat service, for example, Slack®, Facebook® Messenger®, or Skype®.

Provider agents 130A-C may comprise one or more machine learning models 135A-C configured to process a request from the requester agent 110A. For example, the one or more machine learning models 135A-C may be configured to process request data comprising text, video, audio, haptic, or other data. A provider agent may place a bid for the chance to fulfill the request from the requester agent. The value of the bid may be based on the content of the request, the reward, or other information needed by the provider agent to fulfill the request. For example, the value of the bid may be based at least in part on an average reward given out by the requester, an average bid of the winning proposal for this request class, or an average number of proposals sent to an instance of the class.

A machine learning model of machine learning models 135A-C may be a (e.g., generative) model that generates an answer to a request. A generative model, as opposed to a discriminative model, may be a model that generates new data instances. It can be a natural language processing (NLP) model, a natural language understanding (NLU) model, a foundational model, a large language model (LLM), a long short-term memory (LSTM) model or an image generation model. In some embodiments, the requester agent 110 generates a request for text. A provider agent of provider agents 130A-C may generate a prompt for a large language model (LLM) (e.g., serve as a prompt engineer) from the request, and process the prompt with a large language model. The system may then provide output of the large language model (e.g., text) back to the requester agent.

The administrator agent 120 may facilitate exchange of messages and data between the requester agent 110 and provider agents 130A-C. For example, the administrator agent 120 may avail the request from the requester agent 110 to the provider agents 130A-C. The administrator agent 120 may accept bids from the provider agents 130A-C, and select a highest bid. And the administrator agent 120 may allocate a reward to one or more of the provider agents 130A-C. A reward allocation from a requester agent 110 to a provider agent may be, for example, the total reward minus a value of the lowest bid that would have resulted in the selection of the provider agent for fulfillment of the request. In some embodiments, a reward allocation is the total reward minus the bid from the provider agent. In some embodiments, a reward allocation is a predetermined fraction of the total reward.

Figure 2:
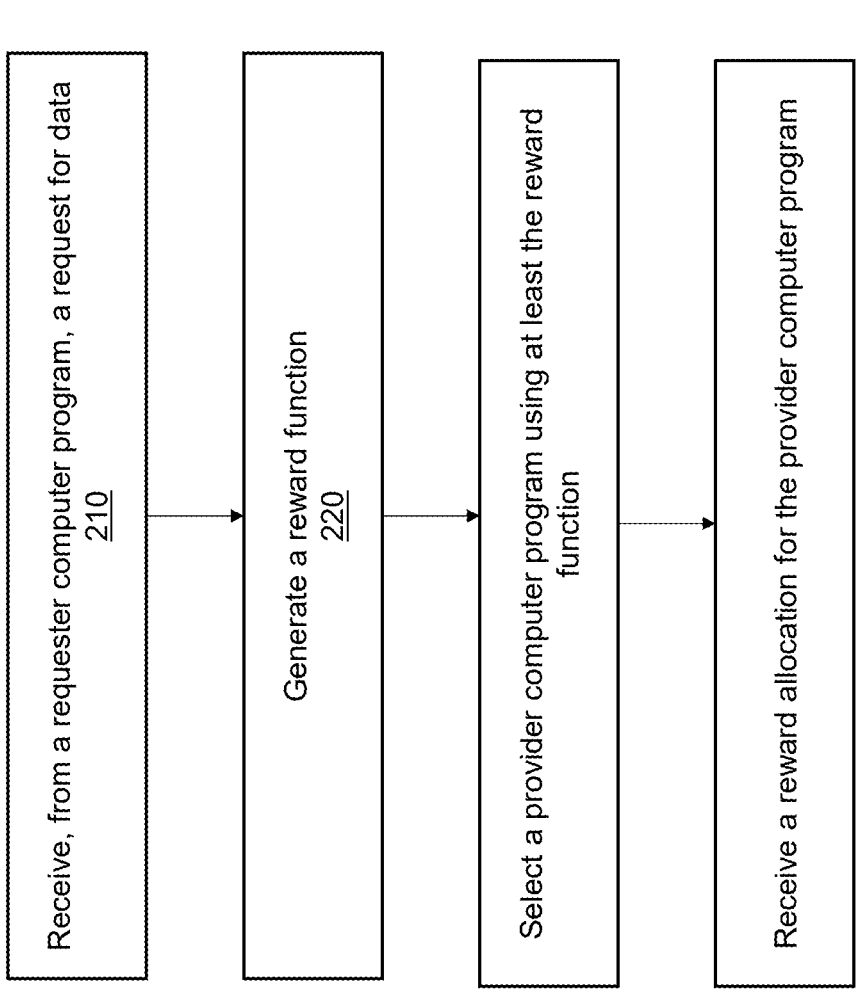
FIG. 2 illustrates a process for automatically fulfilling a request for processed data, in accordance with some embodiments.

FIG. 2 illustrates a process 200 for automatically fulfilling a request for processed data, in accordance with some embodiments.

In a first operation 210, an administrator program receives a request for data from a requester computer program. The requestor computer program may be an automated chat program. The requestor program may provide automated chat messages to a user via a user interface. The request for data may comprise a request for an output generated by a machine learning model. The machine learning model may be a generative model that is specifically relevant to the request for data (e.g., a natural language processing model, a natural language understanding model, or a foundational model). The output may be provided by an automated chat program.

In a second operation 220, the administrator program generates a reward function. The reward function may determine a reward based at least in part on a plurality of response signals. A response signal of the plurality of response signals may be based at least in part on the request for data. The response signal is a highest-value response signal.

In a third operation 230, the administrator program may select a provider computer program using at least the reward function. Selecting a provider computer program using at least the reward function may comprise: providing a value of the reward to a plurality of provider computer programs; receiving a plurality of response signals from a plurality of provider computer programs; selecting the provider computer program based at least in part on a response signal of the provider computer program. Selecting a provider computer program may comprise verifying whether the provider computer program is whitelisted by the requester computer program.

In a fourth operation 240, the administrator program may provide, to the requester computer program, a fulfilled request from the provider computer program. The fulfilled request may be generated at least in part by processing the request for data with a machine learning model. Processing the request for data may comprise generating a generative model text prompt. Providing the fulfilled request may comprise verifying an electronic credit balance of the requester computer program. Providing the fulfilled request may comprise verifying one or more credentials of the requester computer program.

In a fifth operation 250, the administrator program may receive, from the requester computer program, a reward allocation for the provider computer program. The reward allocation may comprise a portion of the reward. The portion of the reward may be equal to a lowest value response signal of the provider computer program subtracted from the value of the reward. The lowest value response signal of the provider computer program may correspond to a smallest-magnitude value that would have resulted in the provider program being selected. The reward may comprise an electronic credit.

Figure 3:
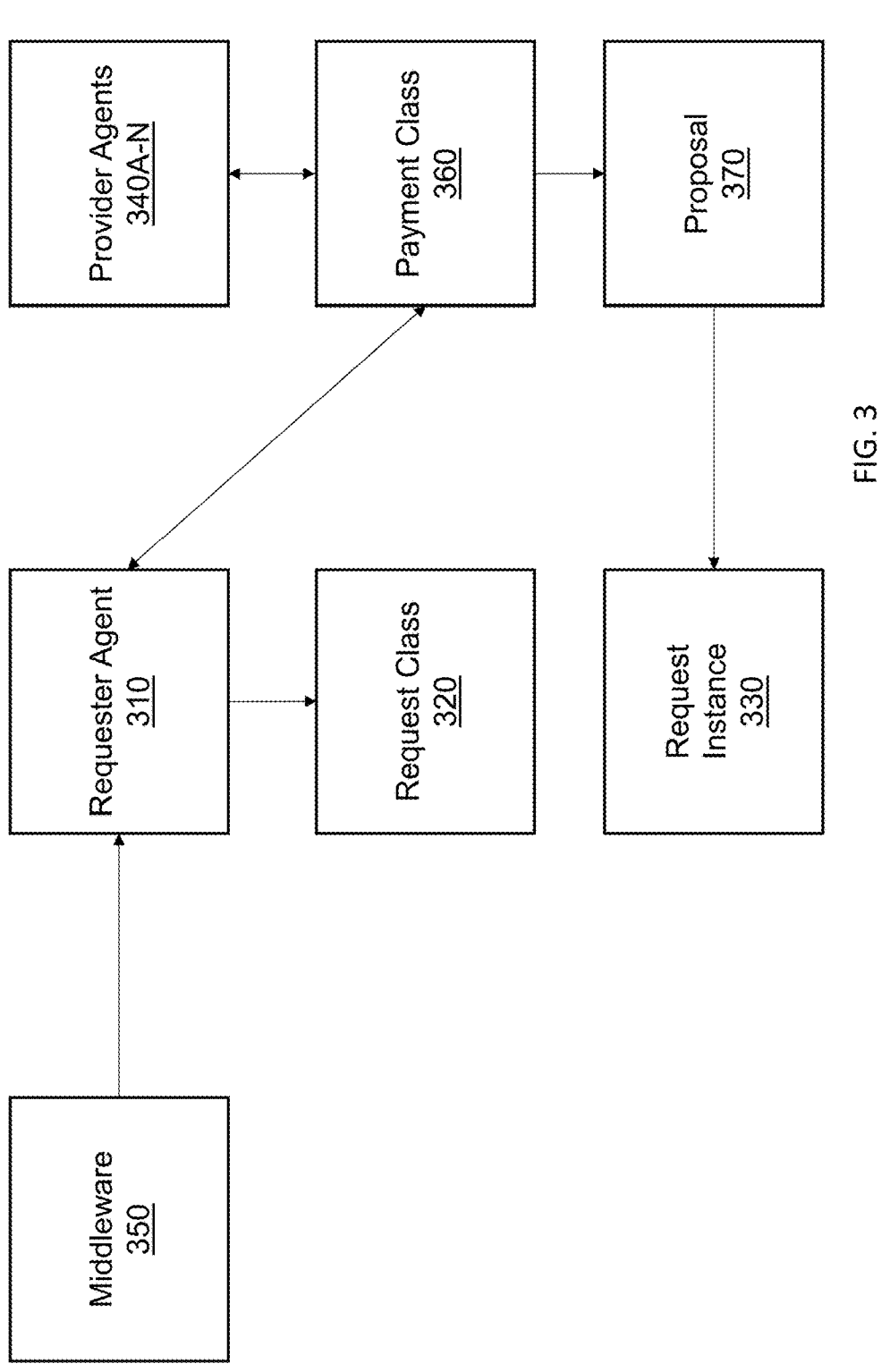
FIG. 3 illustrates a software diagram for automatically fulfilling a request for processed data, in accordance with some embodiments.

FIG. 3 illustrates a software diagram 300 for automatically fulfilling a request for processed data, in accordance with an embodiment.
Requester Agent A requester agent 310 can perform create, update, read, and delete (CRUD) actions on objects of a request class and of a request instance.

A requester agent 310 is derived from a user class and hence may be associated with data belonging to one or more of the following fields:

1. userID: uuid
2. . email: string
3. . username: string
4. . fullName; string
5. . encryptedPassword: string
6. .[ . . . ]
7. . WhitelistedProposers: array
8. . BannedProviders: array A request class 320 may include the following fields. In some embodiments, a request class may comprise at least a portion of the fields of the request class 320.

1. Request Class identifier (uuid)
2. Request Class Creator (uuid of creator/user)
3. Messages (dictionary which contains the LLM interactions): OpenAI compatible LLM Chat request body
4. Model (text field): LLM Model desired by the requester for execution of the task defined in the Instance.
5. Background (text field): a description of the problem to be solved and the context.
6. Max reward per instance (float) (e.g., denoted as max_reward)
7. Max timeout per instance (timestamp) in seconds
8. Max reward-feedback timeout (timestamp) in seconds
9. Percentage of reward to be shared (float) (e.g., denoted as %_reward): the percentage of the reported reward that is shared with the provider.
10. Reserve price (float)
11. WhitelistedProviders (array)
12. BannedProviders (array)
13. Reported reward by the requester (e.g., denoted as reported_reward)

A specific request class may include information that is shared across its instances. For example, a grocery store bot may include a textual description of a style of communication that potential clients may expect from the store.

Whenever a request class 320 is created, a requester agent 310 may be provided with:

1. An endpoint to call to automate the Instances creation.
2. A form to create request instances 330, which is a human usable user interface (UI) front end to the endpoint.

A request instance 330 may be instantiated from a request class 320, and may be defined as:

1. Instance identifier (ID) (used for callback)
2. Messages (Conversation text of the instance): OpenAI chat API compatible LLM conversation that will be sent to the endpoint of the winning provider
3. Background: a description of the problem expected to be solved and the context.
4. bids (array)
5. Provider agents 340A-N bidding on the instance (array)
6. BlockedProviders (array)
7. WhitelistedProviders (array)

The instance can also include instance specific values of:

1. Max timeout per instance (timestamp) in seconds
2. Max reward per instance (e.g., denoted as max_reward)
3. Max reward-feedback timeout (timestamp) in seconds
4. Percentage of reward to be shared (float) (e.g., denoted as %_reward)
5. Reserve-price (float)

For example, a user arriving at a grocery store website and being greeted by a sales agent bot, the instance, may include the name of the customer, their previous purchases and browsing history on the store. If it is a particularly good customer (say as given by a Boolean flag on the database of the grocery store), the reserve price associated with the customer might be higher.

The system might contain a credit system where all users will have the ability to put their credits.

A payment class 360 may assume all credit functions, including

1. Checking wallet balance
2. Holding credits
3. Releasing credits
4. Transferring credits When an instance is created, one or more checks may be implemented:

1. Check credits of the requester are sufficient to create the Instance
2. Check the requester have the right credentials to populate the class to create the instance (e.g. all required fields, for example login credentials in the case of an e-commerce owner if that is required by the class)

If all checks pass, the instance may be created and the credits from the requester agent 310 may be blocked for the instance_id (via the Payment Class).

On an instance page, the requester agent 310 can check how many bids are being proposed so far, view the providers 340 submitting, and ban (blacklist) providers from accepting their requests. They can also create whitelists of providers 340 allowed to bid on a given set of instances.

The bids from the providers for this instance may be also blocked in the credit system via the payment class.

It is possible to specify whether a provider is whitelisted or blacklisted for a request instance, a request class, or for a requester class as indicated in the parameters above. Importantly, whether a provider is blacklisted or whitelisted is a mutable property of the class where the property is specified.

Once the instance ends (max timeout per instance), the requester sends the 'Messages' payload of the instance to the endpoint provided by the winning provider (in the winning proposal, explained below). All non-winning providers may be credited back their bid amounts.

Using the instance_id, the requester agent 310 may call an endpoint to upload the value of the reward (e.g., reported_reward) it generated as well as the conversation. If the percentage reward multiplied by the reported reward, minus the bid (e.g., '%_reward*reported_reward–bid') exceeds the maximum reward for the instance then the maximum reward assigned to the instance may be shared to the provider agent.

If '%_reward*reported_reward<max_reward' then the system may compute:

1. Provider agent gets '%_reward*reported_reward−bid' in its credits
2. Requester agent gets 'max_reward−(%_reward* reported_reward−bid)' in its credits If '%_reward*reported_reward−bid' is positive then the provider gets back their initially held bid in their credits too. If '%_reward*reported_reward−bid' is negative then the provider gets back in their credits uniquely what remains of their bid after settling their net negative reward.

If the requester agent 310 does not call the callback function within a particular amount of time (max reward–feedback timeout), the provider may receive the 'max_reward'.

Provider Agent

The provider agent (e.g., of provider agents 340A-N) is derived from a user class and similarly to the requester agent may be associated with the following fields:

The provider agent (e.g., of provider agents 340A-N) is derived from a user class and similarly to the requester agent may be associated with the following fields:

1. userID: uuid
2. email: string
3. username: string
4. fullName; string encryptedPassword: string It may have access to a list of all instances created and make CRUD operations on objects of a proposal class.

When navigating to a certain request class, a provider agent may see 1. creator of the subclass
2. average reward given out per instance
3. average number of proposals per instance
4. average bid of winning proposals A proposal 370 may refer to one of the following:

1. Endpoint that will be serving the responses
2. Bid that the provider agent is willing to pay for the usage of that endpoint (it cannot be higher than the max reward)

A proposal is instantiated from a proposal class and defined as:

1. id (uuid)
2. endpoint (uuid)
3. maxBid (float)
4. body (string)
5. creationDate (timestamp)
6. status (int): the status of the proposal (e.g., winning or losing)
7. shared reward (int): the amount of reward obtained by the provider that submitted this proposal
8. responseFormat: —specified below—

The body is a message that the provider will receive on its endpoint from the requester. Given that there will be a conversation between the requester and the provider, the body may be structured as in the following:

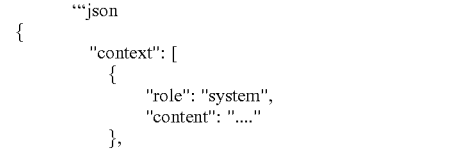

```
```json
{
    "context": [
        {
            "role": "system",
            "content": "...."
        },
```

-continued

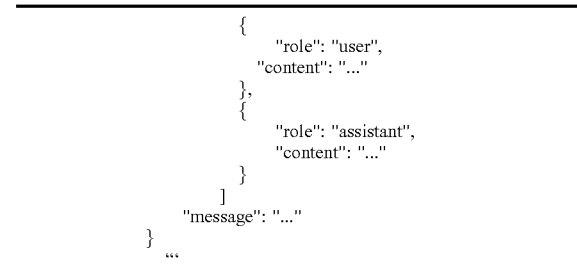

```
    {
        "role": "user",
        "content": "..."
    },
    {
        "role": "assistant",
        "content": "..."
    }
    ]
    "message": "..."
}
```

The provider may respond to the requester agent 310 with the following responseFormat:

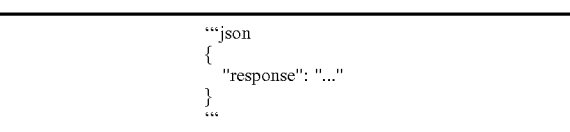

```
```json
{
    "response": "..."
}
```

The middleware 350 may facilitate message and data exchange between the requester agent 310 and one or more of provider agents 340A-N. The middleware 350 may provide an application programming interface (API) endpoint. For each API call, the system may translate the API call to an endpoint of a provider agent. This may be handled using a secure mapping system.

When a hypertext transfer protocol (HTTP) request is made to the API endpoint provided by the middleware, the system may forward the request to the provider endpoint based on the internal mapping.

Figure 4:
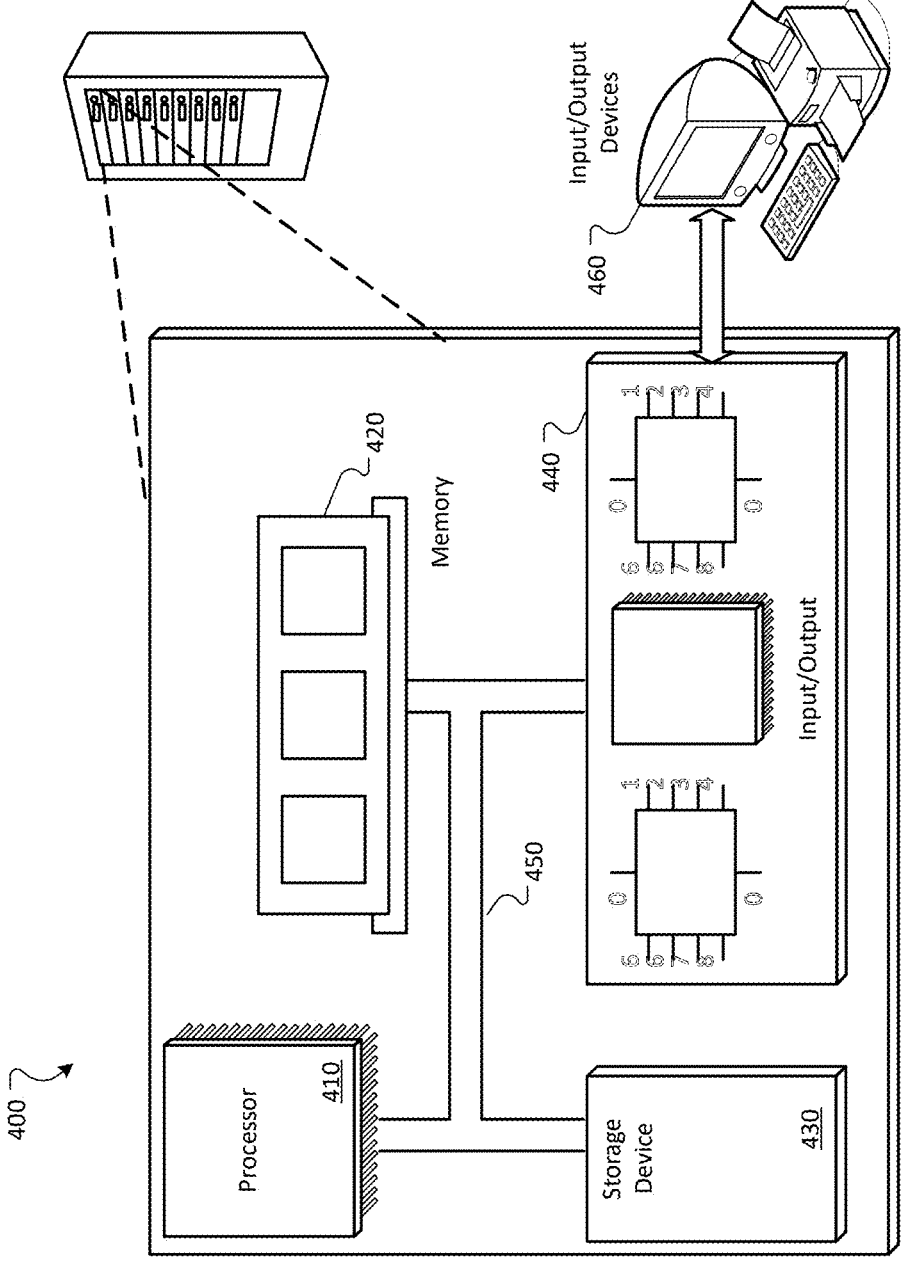
FIG. 4 illustrates a computer system.

FIG. 4 is a block diagram of an example computer system 400. For example, FIG. 1 could be an example of the system 400 described here, as could a computer system used by any of the users who access resources of FIGS. 1-3 as shown in FIG. 1. The system 400 includes a processor 410, a memory 420, a storage device 430, and one or more input/output interface devices 440. Each of the components 410, 420, 430, and 440 can be interconnected, for example, using a system bus 450.

The processor 410 is capable of processing instructions for execution within the system 400. The term "execution" as used here refers to a technique in which program code causes a processor to carry out one or more processor instructions. In some implementations, the processor 410 is a single-threaded processor. In some implementations, the processor 410 is a multi-threaded processor. In some implementations, the processor 410 is a quantum computer. The processor 410 is capable of processing instructions stored in the memory 420 or on the storage device 430. The processor 410 may execute operations such as implementing a requester agent or a provider agent.

The memory 420 stores information within the system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a non-transitory computer-readable medium. In various different implementations, the storage device 430 can include, for example, a hard disk device, an optical disk device, a solid-state drive, a flash drive, magnetic tape, or some other large capacity storage device. In some implementations, the storage device 430 may be a cloud storage device, e.g., a logical storage device including one or more physical storage devices distributed on a network and accessed using a network, such as the network shown in FIG. 1. The input/output interface devices 440 provide input/output operations for the system 400. In some implementations, the input/output interface devices 440 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, etc. A network interface device allows the system 400 to communicate, for example, transmit and receive data such as electronic health record data as shown in FIG. 1, e.g., using the network shown in FIG. 1. In some implementations, the input/output device can include driver devices configured to receive input data and send output data to other input/output devices, e.g., keyboard, printer and display devices 460. In some implementations, mobile computing devices, mobile communication devices, and other devices can be used.

Referring to FIG. 1, the system components can be realized by instructions that upon execution cause one or more processing devices to carry out the processes and functions described above, for example, processing a request from a requester agent. Such instructions can include, for example, interpreted instructions such as script instructions, or executable code, or other instructions stored in a computer readable medium.

A request fulfillment system as shown in FIG. 1 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 400 is contained within a single integrated circuit package. A system 400 of this kind, in which both a processor 410 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 440.

Although an example processing system has been described in FIG. 4, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server (e.g., record processing system as shown in FIG. 4) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Machine Learning

Machine learning models herein may use one or more natural language processing and/or natural language understanding algorithms.

In some embodiments, the machine learning models may be large language models. A large language model (LLM) is a language model that may learn statistical relationships from text documents to be able to generate, interpolate, or predict language (e.g., in text form). It may be built with a transformer-based architecture. In many cases, LLMs are built using decoder-only architectures.

Figure 5:
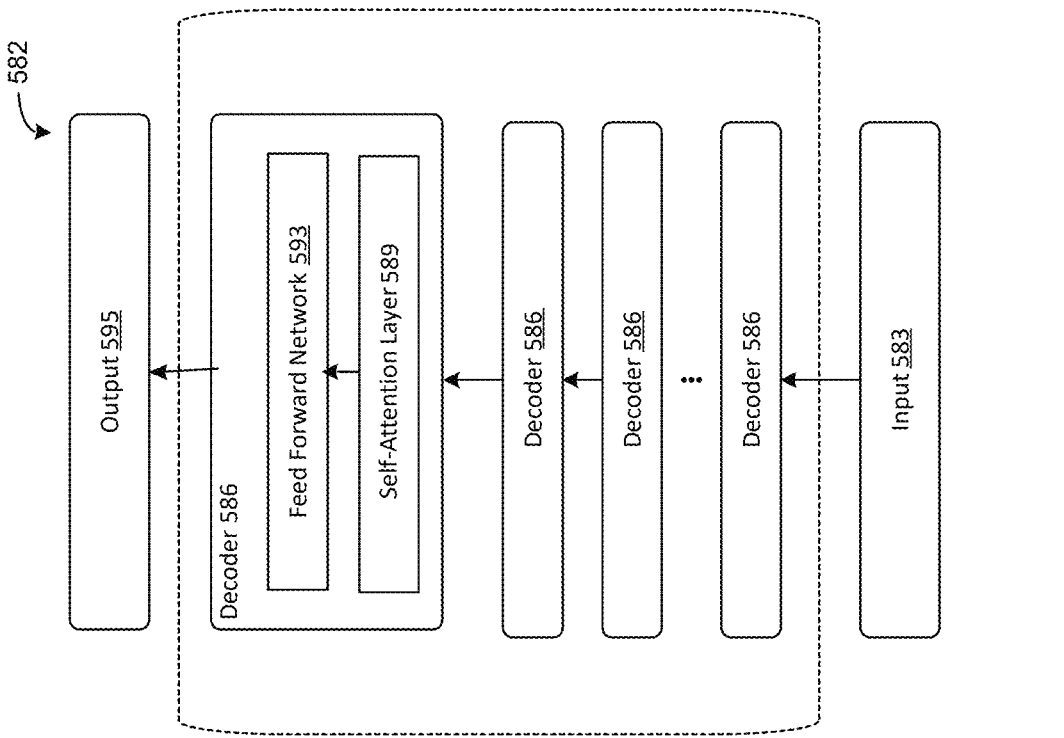
FIG. 5 illustrates an implementation of a machine learning model, in accordance with some embodiments.

Referring now to FIG. 5, illustrated is a diagram of an implementation of a machine learning model. More specifically, illustrated is a diagram of an implementation of a decoder-only transformer model 582. As will be described in more detail, the transformer model 582 may include a self-attention mechanism to capture the relative significance and relationship between different portions of an input 583. For instance, in cases where the input 583 is text, the self-attention mechanism of the transformer model 582 may capture the relative significance and relationship amongst different portions (e.g., words or phrases of the text) when generating an output 595 that includes, for example, a response to a query presented by the text. While the transformer model 582 includes certain features as described herein, these features are provided for the purpose of illustration and are not intended to limit the present disclosure.

As shown in FIG. 5, the transformer model 582 may include a decoder stack having a plurality of decoders 586 (or decoding layers). In the example shown in FIG. 5, the input 583 (e.g., the embedding of each individual portion of the input 583) flows through every decoder 486 in the decoder stack.

Referring again to FIG. 5, the decoder stack may decode the input 583 to generate the output 595, with each decoder 586 in the decoder stack successively decoding the output of the previous decoder 586. For example, the first decoder 586 in the decoder stack may generate a first decoding of the input 583 (e.g., the embedding of each individual portion of the input 583) while the next decoder 586 in the decoder stack may generate a second decoding of the first decoding. As shown in FIG. 5, each decoder 586 may include a self-attention layer 589 and a feed forward network 593. The self-attention layer 589 of the decoder 586 may enable the decoder 586 to generate a context-aware decoding of the input 583 where the decoding for each individual portion of the input 583 incorporates weighted values corresponding to one or more preceding portions of the input 583. For example, in cases where the input 483 is text, the self-attention layer 485 may determine the relationship between different sections of the text. In some cases, the self-attention layer 589 may include a multi-headed attention mechanism, with each head applying a different set of weights (e.g., query, key, and value weight matrices) for incorporating the other portions of the input 583. It should be appreciated that the weights (e.g., query, key, and value weight matrices) applied by the self-attention layer 589 may be learned during the training of the transformer model 582.

Tokenization

Transformers convert input text into tokens, which are processed by an encoder and/or decoder. Using a modification of byte-pair encoding, in the first step, all unique characters (including blanks and punctuation marks) are treated as an initial set of n-grams (i.e. initial set of uni-grams). Successively the most frequent pair of adjacent characters is merged into a bi-gram and all instances of the pair are replaced by it. All occurrences of adjacent pairs of (previously merged) n-grams that most frequently occur together are then again merged into even lengthier n-gram repeatedly until a vocabulary of prescribed size is obtained. Token vocabulary consists of integers, spanning from zero up to the size of the token vocabulary. New words can always be interpreted as combinations of the tokens and the initial-set uni-grams.

A token vocabulary based on the frequencies extracted from mainly English corpora uses as few tokens as possible for an average English word.

To find which tokens are relevant to each other within the scope of the context window, the attention mechanism calculates "soft" weights for each token, more precisely for its embedding, by using multiple attention heads, each with its own "relevance" for calculating its own soft weights.

A model may, for example, be pre-trained to predict how the segment continues (autoregressive), or what is missing in the segment, given a segment from its training dataset. An autoregressive model, for example, given a segment "I like to eat", may predict "ice cream", or "sushi." A model trained to predict what is missing, for example, given a segment "I like to [_____] [_____] cream", may predict that "eat" and "ice" are missing.

Models may be trained on auxiliary tasks which test their understanding of the data distribution, such as Next Sentence Prediction (NSP), in which pairs of sentences are presented and the model must predict whether they appear consecutively in the training corpus. During training, regularization loss is also used to stabilize training. However, regularization loss is usually not used during testing and evaluation.

Attention

The transformer building blocks are scaled dot-product attention units. For each attention unit, the transformer model learns three weight matrices: the query weights, the key weights, and the value weights. For each token, the input token representation is multiplied with each of the three weight matrices to produce a query vector, a key vector, and a value vector. Attention weights may be calculated using the query and key vectors: the attention weight between two tokens is the dot product between the query and key elements respectively corresponding to each token. The attention weights may be divided by the square root of the dimension of the key vectors, which stabilizes gradients during training, and passed through a softmax which normalizes the weights. The fact that the query weights and key weights are different matrices allows attention to be non-symmetric. The output of the attention unit for a token is the weighted sum of the value vectors of all tokens, weighted by the attention from the token to each other token.

Multi-Attention

One set of query, key, and value matrices may comprise an attention head. Each layer in a transformer model may have multiple attention heads. Each attention head generates weights signifying attention tokens that are relevant in some way to each token. Using multiple attention heads allow the model to do this for different definitions of "relevance." Each of many transformer attention heads may each encode different relevance relations that are meaningful to humans. For example, some attention heads can attend mostly to a next word in a sequence, while others mainly attend from verbs to their direct objects. The computations for each attention head can be performed in parallel, which allows for fast processing. The outputs for the attention layer are concatenated to pass into the feed-forward neural network layers.

Bidding Mechanism

The following sections describe an example statistical framework in which the administrator agent may fulfill requests from requester agents that are bid on by provider agents. The following section should not be construed to limit any preceding sections of this disclosure.

There is a single subject that seeks advice from n experts on what action to take from some finite set of alternatives $\mathcal{A}$. Let $c_i \in \mathcal{A} \times n$ be the action that was given as advice by expert i. Let $a \in \mathcal{A}_1$ be the action that the subject takes. Each expert receives a single signal $s_i \in S_i$ which is known only to expert i. Denote a signal profile as $\vec{s}=(s_1, s_2, \ldots, s_n)$. Let $\vec{s}_{-i}$ denote all signals but $s_i$, and let $(s_i', \vec{s}_{-i})$ denote the profile $\vec{s}$ where $s_i$ has been replaced with $s_i'$. Similarly, let $(s_i, \vec{s}_{-i})$ denote the profile $\vec{s}$ where $s_i$ is fixed and $\vec{s}_{-i}$ been replaced with $s'_{-i}$. Each possible signal profile $\vec{s}$ corresponds to an underlying state of the world; this includes inherent physical properties of both the subject and the actions available to them, as well as the subject's probability for choosing a given action response to different advice by different experts. There is a joint probability distribution over signals, actions conditional on advice from experts, and rewards. This distribution is common knowledge among the experts. All expectations are with respect to this distribution. Since the subject can be influenced differently by different experts who provide the same advice (that is experts can differ in how persuasive they are). The reward r that the subject receives depends on their chosen action a and the underlying state of the world as determined by the signal profile $\vec{s}$. Conditional on the chosen action a, it does not depend on the advice it received, that is the advice can only affect the reward by altering the choice of action. Note, it may not be the case that the optimal advice is always the optimal action to be taken (for a given the signal vector). For example, an expert who knows the subject would find the optimal action unpersuasive may opt to advise for a more persuasive second best action that has a high chance of being actually taken. Each agent has a reduced form value function $v_i:\times_i S_i \rightarrow \mathbb{R}_{\geq 0}$, which maps every signal profile of the n agents to the linear share a of the expected reward r given the bundle of rights is assigned to expert i and they provide optimal advice for the signal profile.

$$V_i(s) = \alpha \, \mathbb{E}\left[r|\vec{s}\right]$$

Each expert reports a signal $b_i \in S_i$, and the vector of reported signals is denoted $\vec{b}=(b_1, b_2, \ldots, b_n)$. Without loss of generality, assume $S_i=\{0,1, \ldots, q_i\}$. Mechanisms are pairs $(x, p)$, where $x=(x_1, x_2, \ldots, x_n)$ is a set of allocation functions and $p=(p_1, p_2, \ldots, p_n)$ is a set of payment functions. The allocation functions $x_i:\times_j S_j \rightarrow [0,1]$ map a bid profile $\vec{b}$ to the probability that expert i gets allocated. They hence satisfy $\Sigma x_i(\vec{b}) \leq 1$ for all possible $\vec{b}$. The payment rules $p_i:\times_j S_j \rightarrow \mathbb{R}$ map the reported signals $\vec{b}$ to the expected payment from bidder i. Experts are risk neutral, so their expected utility is quasilinear, given in the reduced form by $x_i(\vec{b}) \cdot v_i(\vec{s}) - p_i(\vec{b})$ where $\vec{s}$ is the true signal profile of the experts. Advice is termed optimal for the expert if the expected value of the reward conditional on the chosen expert i, their advice $c_i$ and the true signal vector $\vec{s}$, is maximized. An advice mechanism is efficient if it leads to optimal advice over all potential experts given any potential true signals $\vec{S}$. Formally, an advice mechanism is efficient when $c_i^*$ is such that for any other expert j and any advice $c_j'$.

$$\mathbb{E}\left[r|\vec{s}, c_i^*\right] \geq \mathbb{E}\left[r|\vec{s}, c_j'\right]$$

Advice Auctions with Privately Informed Experts

When an expert's signal is sufficiently rich, in the sense that it is fully informative of both what their optimal advice is and what reward to expect from it, a strong notion of truth telling, dominant strategy, is possible for an advice auction. In the dominant strategy it is in every agent i's best interest to report their true signal $b_i=s_i$ for any possible vector of reports of other agents. A second price sealed bid auction for the right to provide the advice and receive a linear share a of the reward, results in a dominant equilibrium where the advice provided is efficient.

Mechanism 1. [Second Price Auction for Advice and Reward Share (SPAAR)]

Each expert places a bid for the value of receiving the rights bundle. The first part of the mechanism gives the rights bundle to the expert $i^*=\mathrm{argmax}_j\{\vec{b}\}$ with the highest bid (a randomly picked one of them, if there are several). This expert $i^*$ then provides their advice c. That is, the allocation rule is:

$$x_i(\vec{b}) = \begin{cases} 1 & \text{if } i = \mathrm{argmax}_j \vec{b} \\ 0 & \text{otherwise.} \end{cases}$$

The experts that were not selected receive no payment, while the selected expert $i^*$ receives her share a of the reward r minus the value of the second highest bid. More formally, given $\vec{b}_{-i^*}$ (the bids for all agents except $i^*$), the payment rule is $$p_i(\vec{b}) = \begin{cases} \alpha r - \max \vec{b}_{-i} & \text{if } b_i > \max \vec{b}_{-i} \\ 0 & \text{otherwise.} \end{cases}$$

A valuation profiles satisfies a private value condition when each experts i signal $s_i$ contains all the information in the $\vec{s}$ for them to give their optimal advice (that is maximize r subject to them being the expert providing advice), and know what reward to expect from doing so. Thus there is no further information that is relevant to their choice of action or their expected reward if they are given the rights bundle in the signals received by the other experts $\vec{s}_{-i}$.

Definition 1 (Private Value Condition). For a fixed expert i with signal $s_i$ and their optimal advice $\mathcal{C}_i^*$, and for any set of other experts signals $\vec{S}'_{-i}$:

$\mathbb{E}[r|\vec{s}, c_i] = \mathbb{E}[r|(s_i, \vec{s}'_{-i}), c_i^*]$ This condition can be re-stated in terms of the reduced form valuation profiles as: A valuation profile $v_i(\vec{s})$ is said to satisfy the private value condition if for every expert i, for any fixed $s_i$, and for any other expert's signals $\vec{s}_{-i}$ we have: $v_i(\vec{s})=v_i((s_i, \vec{s}'_{-i}))$. The condition is very strong, but the exact match it provides to the natural private value goods setting makes an instructive starting point.

Proposition 1. Given a valuation profile that satisfies the Private Value Condition there is a weakly dominant strategy equilibrium of the Mechanism 1 that results in efficient advice. Proof. The first part of the mechanism is a second price sealed bid auction with private values. Given the Private Value Condition (Definition 1) if they have the highest bid the payoff to expert i is their expected share of the reward conditioned on their signal $s_i$, which is identical to giving their optimal advice conditioned $\vec{s}$, minus the second highest bid. If they bid below their expected reward it does not change their payoff when they win the auction, but it does reduce the set of states of the world where they are awarded the rights bundle, but in all of them this has expected profit. If they bid above their value it only increases the set of states of the world in which they are awarded the rights bundle but only in those states of the world where it has negative profit. Since there are no further repercussions in the mechanism from their bid, it is a dominant strategy to bid their expected value. The expert i who places the highest bid and is awarded the rights bundle then maximizes their payoff by selecting their advice $c_i^*$ which maximizes the reward given $\vec{s}$, and by (Definition 1) they have all the information in their signal $s_i$ to do so. If there was an expert j who could provide advice $c_j'$ that obtained a higher reward they would have had a higher valuation $v_j$ and won the second price auction in the first part of the mechanism. Thus, for any $c_j'$:

$$\mathbb{E}\left[r|\vec{s}, c_i^*\right] \geq \mathbb{E}\left[r|\vec{s}, c_j'\right]$$

The condition can be substantially weakened, since the value of the rights bundle only needs to be private (in the sense that other experts signals are not further informative) for the highest valuation expert i*. This is a much more natural condition than it being private value to all experts. It emerges naturally when the evidence base the experts have access to is common, so the signals are only encoding internal knowledge of the experts. The most knowledgeable expert might thus be sufficiently informed that even when observing the reasoning of the others, it would not change their diagnosis or estimate of the right course of action.

Definition 2 (Sufficiently Informed Best Expert Condition). There is a highest value expert i with signal $s_i$, and their optimal advice $c_i^*$, such that for any set of other experts signals $\vec{s}'_{-i}$ and for any other experts $j \neq i$ advice $c_j^*$ $$\mathbb{E}\left[r|\vec{s}, c_i^*\right] = \mathbb{E}\left[r|(s_i^*, \vec{s}_{-i}), c_i^*\right] \geq \mathbb{E}\left[r|(s_i^*, \vec{s}_{-i}), c_j'\right]$$

In terms of the reduced form valuation profiles: A valuation profile $v(\vec{s})$ is said to satisfy the sufficiently informed best expert condition if there is a highest valued expert i, such that for all j: $v_i(\vec{s}) > v_j(\vec{s})$, and for the fixed $s_i$, and for any other expert's signals $\vec{s}'_{-i}$ we have $v_i(\vec{s}) = v_i((s_i, \vec{s}'_{-i}))$ Note that this is equivalent to the Private Value Condition for the most valuable expert, and imposes no structure on the valuation profiles of other experts other than they be lower than the highest expert.

Theorem 1. Given a valuation profile that satisfies the Sufficiently Informed Best Expert Condition there is an ex-post efficient Nash Equilibrium of the Mechanism 1 that results in efficient advice.

Proof. For the highest valuation bidder nothing has changed relative to the private values setting so their dominant strategy in the auction and their actions once awarded the rights bundle remain the same as in the private value condition. That is their bid is their value $b_i = v_i(s_i)$. For any other agent j there are a multiplicity of equilibrium strategies that result in the same efficient allocation of the rights bundle in (but different payments to the highest value expert): any bid $b_j < b_i$ is an ex-post Nash Equilibrium. They are never assigned the rights bundle and always receive payoff 0. If they bid at or higher than $b_i$ they might be assigned the bundle and since by Definition 2 their value is lower than this, would obtain a negative payoff. Thus in equilibrium their bid is below $b_i$ and they are never awarded the good. For concreteness consider the equilibrium of the auction in which $b_j = v_j(s_j)$. As in the private value case, the expert i who places the highest bid and is awarded the rights bundle then maximizes their payoff by selecting their advice $c_i^*$ which maximizes the reward given $\vec{S}$, and by (Definition 2) they have all the information in their signal $s_i$ to do so. If there was an expert j who could provide advice $c_j'$ that obtained a higher reward they would have had a higher valuation $v_j$ and by definition won the second price auction in the first part of the mechanism. Thus, for any $$c_j': \mathbb{E}\left[r|\vec{s}, c_i^*\right] > \mathbb{E}\left[r|\vec{s}, c_j'\right]_4$$

The previous mechanism can be generalized beyond private values or sufficiently informed best expert conditions by replacing the second price sealed bid with a generalized VCG mechanism for the initial stage that assigns the rights bundle to the expert, and then allowing the expert to observe the reported bid vector before the selection of the action a. This mechanism is direct in the standard sense that agents report their signals. Note these mechanisms are longer an auction, and while conceptually simple, the mechanism makes direct use of the value function of all agents. The core of the mechanism is simple. Since there is knowledge by the mechanism over the value function for a given vector of signals, it can use the reported signals to select the highest value expert. The net payment to that expert is then just her share of the reward minus her value at the lowest signal she could have misreported and still obtained the allocation give the other reports.

Mechanism 2. [Direct Reward Share VCG (DRSVCG)] The first part of the mechanism gives the rights bundle to the expert $i^* = \text{argmax}_j\{v_j(\vec{b})\}$ with the highest valuation under the reported signals (a randomly picked one of them, if there are several). It lets the expert i* observe $\vec{b}$ and then select c*. The subject then observes c* and $\vec{b}$, takes their action a and receives reward r, which the mechanism observes. That is, the allocation rule is $$x_i(\vec{b}) = \begin{cases} 1 & \text{if } i = \text{argmax}_j \{v_j(\vec{b})\} \\ 0 & \text{otherwise.} \end{cases}$$

The experts that were not selected receive no payment, while the selected expert i_* receives her share $\alpha$ of the reward r minus her valuation of the lowest bid $b_{i*}^*$ (the critical signal) that would have still resulted in expert i_* being selected. More formally, given $\vec{b}_{-i}$ (the bids for all agents except i), the critical signal for i is $b_i^* = \min\{b \in S_i | x_i(b, \vec{b}_{-i}) = 1\}$ if this minimum exists (otherwise there is no critical signal for i). The payment rule then is $$p_i(\vec{b}) = \begin{cases} \alpha r - v_i(b_i^*, \vec{b}_{-i}) & \text{if } i = i* \\ 0 & \text{otherwise.} \end{cases}$$

An allocation function $x_i$ is called deterministic if $x_i(\vec{b}) \in \{0,1\}$ for all $i$ and all $\vec{b}$. The generalized direct VCG mechanism is deterministic and prior-free. It is not however detail free, in the sense that it requires the mechanism to have access to the valuation function of all experts. In general, one cannot hope for truth-telling to be a dominant strategy for the experts. One expert's misreport can cause other experts to also misreport to compensate. Thus the strongest incentive-compatibility (IC) notion that we can hope for in the general setting is ex-post Nash Equilibrium. That is, it is in every agent $i$'s best interest to report her true signal $b_i = s_i$ given that all other agents reported their true signals profile $b_{-i} = \vec{S}_{-i}$. Fix a signal profile $\vec{s} \in \times_j S_j$. For all $b_i \in S_i$ there are $x_i(\vec{s}) \cdot v_i(\vec{s}) - p_i(\vec{s}) \geq x_i(b_i, \vec{s}_{-i}) \cdot v_i(\vec{s}_{-i}) - p_i(b_i, \vec{s}_{-i})$ The equivalent, ex- post notion of individually rational (IR):

$x_i(\vec{s}) \cdot v_i(\vec{s}) - p_i(\vec{s}) \geq 0$ As is standard, a mechanism is truthful when it is both incentive compatible and individually rational.

Lemma 1. Given a valuation profile resulting in an efficient truthful equilibrium of the initial generalized VCG part of the mechanism, the resulting advice is optimal.

Proof. Since the highest valuation agent is selected by construction in the truthful efficient equilibrium of the generalized direct VCG mechanism, and this agent is selfish and has access to the reports of the signal profile. Since by assumption the equilibrium is truthful $\vec{b} = s$, so the expert $i$ when selecting the advice $$c_i^s$$

it can effectively condition on $\vec{Ss}$, and so maximize their payoff by maximizing the reward conditioned on $\vec{s}$. It is worth highlighting that the lemma is assuming the generalized direct VCG initial part of the mechanism results in an efficient equilibrium. While such equilibria exist when the signal structure is suitable they are not necessarily unique.

Efficiency

The link to auction theory allows to immediately derive results when the information structure of the experts is more complicated, such that they need to consider the signals (as expressed in their reports) of the other experts to decide upon the optimal advice. A single-crossing condition captures the idea that bidder $i$'s signal has a greater effect on experts $i$'s value than on any other expert's value. For $s_i = 1, \ldots, k_i$, define $$\frac{\partial v_j(s_i, \vec{s}_{-i})}{\partial s_i} = v_j(s_i, \vec{s}_{-i}) - v_j(s_i - 1, \vec{s}_{-i})$$

Definition 3 (Single-Crossing). A valuation profile is said to satisfy the single-crossing condition if for every expert $i$, for any set of other expert's signals $\vec{s}_{-i}$, and for every expert $j$, $$\frac{\partial v_i(s_i, \vec{s}_{-i})}{\partial s_i} \geq \frac{\partial v_j(s_i, \vec{s}_{-i})}{\partial s_i}.$$

Lemma 2. There is a truthful and efficient ex-post Nash equilibrium of the generalized VCG part of the DRSVCG mechanism when valuation profiles satisfy the single-crossing property. Further, one cannot do better than this, since monotonicity of the allocation rule is necessary for an efficient and truthful mechanism. Hence, without single-crossing, it is impossible to have a truthful direct mechanism in general. The single crossing condition is needed so that the ex-post values of different bidders have the same order as their signals.

Theorem 2. When valuation profiles satisfy the single crossing property the DRSVCG there is an efficient ex post equilibrium that results in efficient advice.

Proof. From Lemma 2 we have that there is a truthful efficient ex post equilibrium. Given Lemma 1 this implies the advice in this equilibrium is efficient.

Practical Mechanisms

The mechanism having access to the value functions is highly impractical in general. Further, direct mechanisms in the context of motivating experts to provide decision making advice are also highly impractical as experts signals might not be practical to report. It is easy to consider situations in which experts having difficulty understanding each others information, much less having access to a well defined function that is able to incorporate all of it and map it to both optimal advice and a valuation conditional on that advice. It is much more practical for experts to place bids on their value of the rights bundle, rather than directly reporting their signals. This section considers practical advice auctions beyond private values. Access to the value function and the reported signals allows the direct VCG mechanism to select the expert $i$ with the highest valuation. Conditions on the valuation profiles for efficiency of the VCG mechanism are sufficient for an efficient advice mechanism. This is not the case once the mechanism does not have access to the reports and valuation function. That is, even under conditions on the valuation profile such that the initial part of the mechanism would result in an efficient ex post equilibrium, the resulting advice auction need not be efficient. The reason for this is efficient advice requires allocation to the expert with the highest valuation $v_i$, but this value depends on the expert being able to provide optimal advice given the signal $\vec{s}$. Once the signals are not reported to the mechanism, the mechanism cannot reveal them to the expert before it chooses the advice. This suggests a further condition on the equilibrium bids reported that is necessary for an efficient advice mechanism: that there is enough information in the bids reported to the mechanism that when the highest valuation agent is allocated the rights bundle and he is presented with the bids before providing the advice, he is still able to provide the optimal advice.

Definition 4 (Informative-Bids). A bid vector $b$ is said to satisfy the informative-bids condition if for the highest valuation agent $i$ observing the bid vector $b$ from the initial auction stage and their signal $s_i$ the advice $c_i^*$ that maximizes expected reward is equal to when they observe the full signal vector $\vec{s}$. More formally, for any fixed signal profile $\vec{s}$ $$\underset{c_i^*}{\mathrm{argmax}} \ \mathbb{E}\left[r | \vec{s}, c_i^*\right] = \underset{c_i^*}{\mathrm{argmax}} \ \mathbb{E}\left[r | s_i, \vec{b}, c_i^*\right]$$

This condition is unsatisfactory, in that bids result from a specific equilibrium of a valuation profile and a mechanism, and thus are not primitive. What condition on the valuation profiles and mechanism is needed to satisfy this condition is an open problem. Note that mechanism based around sealed bids are impractical to express interdependence of valuations, since to do so the experts would have to place bids contingent on the submitted bids of the other experts. A practical structure that has been substantially studied is using an open ascending auction (also known as an English auction). The price of the rights bundle would rise and experts can irrevocably drop out until there is only one left, who is then awarded the rights bundle, and pays the price at which the last expert dropped out. In the private values case this is equivalent to a second price auction. Efficiency for such auctions requires valuation profiles to obey an average crossing condition, and the advice auction around them would also require that the resulting bids satisfy the informative bids condition.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method performed by one or more processors, comprising:
  receiving, from a requester agent of a processor of the one or more processors, a request for an output, wherein the request is initiated when the requester agent calls an endpoint provided when a request class is generated, wherein the request is an instance of the request class;
receiving, from a plurality of provider agents of at least one of the one or more processors, a plurality of proposal objects, wherein each provider agent comprises a generative artificial intelligence model, wherein a proposal object of the plurality of proposal objects is generated at least in part by:
  (i) generating an input for the generative artificial intelligence model of the provider agent from the request for the output,
  (ii) processing the input using one or more decoder layers of the generative artificial intelligence model of the provider agent, a decoder layer comprising a self-attention layer and a feed-forward network, wherein the self-attention layer enables the decoder to generate a context-aware decoding of the input, the self-attention layer comprising a multi-headed attention mechanism including at least a first head and a second head, the first head applying a different set of weights from the second head, wherein a set of weights comprises a key weight matrix, a query weight matrix, or a value weight matrix, wherein the computations for the first head and the second head are performed in parallel, wherein the outputs for the attention layer are concatenated to pass into the feed-forward neural network,
wherein each proposal object comprises a bid value and the output;
wherein the bid value is included in an array in the request;
  assigning, from an administrator agent of a processor of the one or more processors, a reward to the request, wherein the reward is generated based at least in part on a probability that the requester agent will select a proposal object of the plurality of proposal objects;
  receiving, from the requester agent, a selection of a provider agent of the plurality of provider agents based at least in part on a bid value of a particular proposal object associated with the provider agent;
  forwarding the request for the output to the provider agent, the forwarding the request for the output of the provider agent comprising: maintaining an endpoint for data exchange between the requester agent and the plurality of provider agents; receiving the request for the output as a call; and translating the call to an endpoint of the provider agent using a secure mapping system;
providing, to the requester agent, the output of the particular proposal object; and
providing, from the administrator agent, a reward allocation to the provider agent;
  wherein the reward allocation is equal to a portion of the reward minus a first value, a second value, or a third value;
  wherein the first value is equal to the bid value,
  wherein the second value is equal to a second highest bid value among a plurality of proposal objects associated with the plurality of provider agents,
  wherein the third value is equal to a lowest bid value among the plurality of proposal objects associated with the plurality of provider agents that would have resulted in the selection of the provider agent.

2. The method of claim 1, wherein the generative artificial intelligence model is a natural language processing model or natural language understanding model.

3. The method of claim 2, wherein the natural language processing model or natural language understanding model is a large language model.

4. The method of claim 1, wherein the requester agent is an automated chat program.

5. The method of claim 4, wherein the requester agent provides automated chat messages to a user via a user interface.

6. The method of claim 1, wherein the request comprises input data for the generative artificial intelligence model.

7. The method of claim 1, wherein the output is provided by an automated chat program.

8. The method of claim 1, wherein the bid value is a highest-value bid value among the plurality of proposal objects associated with the plurality of provider agents.

9. The method of claim 1, wherein the reward comprises an electronic credit.

10. The method of claim 1, wherein providing the particular proposal object comprises verifying an electronic credit balance of the requester agent.

11. The method of claim 1, wherein providing the particular proposal object comprises verifying one or more credentials of the requester agent.

12. The method of claim 1, wherein selecting a provider agent comprises verifying whether the provider agent is whitelisted by the requester agent.

13. The method of claim 1, wherein the requester agent comprises a software engineer agent; wherein merging of the output of the particular object by the requester agent provides a resolution to a software issue.

14. The method of claim 1, wherein the requester agent comprises a conversational model; wherein the output of the particular object is used to train or fine-tune the conversational model.

15. The method of claim 1, wherein the request is a hypertext transfer protocol (HTTP) request.

16. The method of claim 1, wherein the reward allocation is incorporated into an average reward per instance for the request class; wherein a bid value of a proposal object is generated at least in part based on the average reward per instance.

17. A system, comprising:
a requester agent of a processor;
a plurality of provider agents of one or more processors, each provider agent comprising a generative artificial intelligence model;
an administrator agent of a processor;
a middleware;
wherein the requester agent is configured to:
generate a request for output, wherein the request is initiated when the requester agent calls an endpoint provided when a request class is generated, wherein the request is an instance of the request class;
select a provider agent of the plurality of provider agents based at least in part on a bid value of a particular proposal object associated with the provider agent;
provide a reward allocation to the administrator agent;
wherein a provider agent of the plurality of provider agents is configured to:
generate a plurality of proposal objects, wherein a proposal object of the plurality of proposal objects is generated at least in part by:

(i) generating an input for the generative artificial intelligence model of the provider agent from the request for the output,
(ii) processing the input using one or more decoder layers of the generative artificial intelligence model, a decoder layer comprising a self-attention layer and a feed-forward network, wherein the self-attention layer enables the decoder to generate a context-aware decoding of the input, the self-attention layer comprising a multi-headed attention mechanism including at least a first head and a second head, the first head applying a different set of weights from the second head, wherein a set of weights comprises a key weight matrix, a query weight matrix, or a value weight matrix, wherein the computations for the first head and the second head are performed in parallel, wherein the outputs for the attention layer are concatenated to pass into the feed-forward neural network,
wherein each proposal object comprises the bid value and the output;
wherein the bid value is included in an array in the request;
wherein the middleware is configured to:
forward the request for the output to the provider agent, comprising: maintaining an endpoint for data exchange between the requester agent and the plurality of provider agents; receiving the request for the output as a call; and translating the call to an endpoint of the provider agent using a secure mapping system;
wherein the administrator agent is configured to:
assign a reward to the request, wherein the reward is generated based at least in part on a probability that the requester agent will select a proposal object of the plurality of proposal objects; and
provide the reward allocation to the provider agent;
wherein the reward allocation is equal to a portion of the reward minus a first value, a second value, or a third value;
wherein the first value is equal to the bid value,
wherein the second value is equal to a second highest bid value among a plurality of proposal objects associated with the plurality of provider agents,
wherein the third value is equal to a lowest bid value among the plurality of proposal objects associated with the plurality of provider agents that would have resulted in the selection of the provider agent.

18. A system, comprising:
at least one data processor; and
memory storing instructions that, when executed by the at least one data processor, cause the at least one data processor to perform operations comprising:
receiving, from a requester agent of a processor of the one or more processors, a request for an output, wherein the request is initiated when the requester agent calls an endpoint provided when a request class is generated, wherein the request is an instance of the request class;
receiving, from a plurality of provider agents of at least one of the one or more processors, a plurality of proposal objects, wherein each provider agent comprises a generative artificial intelligence model, wherein a proposal object of the plurality of proposal objects is generated at least in part by:

(i) generating an input for the generative artificial intelligence model of the provider agent from the request for the output, (ii) processing the input using one or more decoder layers of the generative artificial intelligence model of the provider agent, a decoder layer comprising a self-attention layer and a feed-forward network, wherein the self-attention layer enables the decoder to generate a context-aware decoding of the input, the self-attention layer comprising a multi-headed attention mechanism including at least a first head and a second head, the first head applying a different set of weights from the second head, wherein a set of weights comprises a key weight matrix, a query weight matrix, or a value weight matrix, wherein the computations for the first head and the second head are performed in parallel, wherein the outputs for the attention layer are concatenated to pass into the feed-forward neural network, wherein each proposal object comprises a bid value and the output;

wherein the bid value is included in an array in the request;

assigning, from an administrator agent of a processor of the one or more processors, a reward to the request, wherein the reward is generated based at least in part on a probability that the requester agent will select a proposal object of the plurality of proposal objects;

receiving, from the requester agent, a selection of a provider agent of the plurality of provider agents based at least in part on a bid value of a particular proposal object associated with the provider agent;

forwarding the request for the output to the provider agent, the forwarding the request for the output of the provider agent comprising: maintaining an endpoint for data exchange between the requester agent and the plurality of provider agents; receiving the request for the output as a call; and translating the call to an endpoint of the provider agent using a secure mapping system;

providing, to the requester agent, the output of the particular proposal object; and providing, from the administrator agent, a reward allocation to the provider agent;

wherein the reward allocation is equal to a portion of the reward minus a first value, a second value, or a third value;

wherein the first value is equal to the bid value, wherein the second value is equal to a second highest bid value among a plurality of proposal objects associated with the plurality of provider agents, wherein the third value is equal to a lowest bid value among the plurality of proposal objects associated with the plurality of provider agents that would have resulted in the selection of the provider agent.

\* \* \* \* \*